(12) United States Patent
Koch et al.

(10) Patent No.: US 10,198,590 B2
(45) Date of Patent: Feb. 5, 2019

(54) CONTENT SHARING COLLECTIONS AND NAVIGATION

(71) Applicant: Adobe Systems Incorporated, San Jose, CA (US)

(72) Inventors: Zeke Koch, San Francisco, CA (US); Gavin Stuart Peter Miller, Los Altos, CA (US); Jonathan W. Brandt, Santa Cruz, CA (US); Nathan A. Carr, San Jose, CA (US); Radomir Mech, Mountain View, CA (US); Walter Wei-Tuh Chang, San Jose, CA (US); Scott D. Cohen, Sunnyvale, CA (US); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 376 days.

(21) Appl. No.: 14/938,724

(22) Filed: Nov. 11, 2015

(65) Prior Publication Data
US 2017/0132425 A1    May 11, 2017

(51) Int. Cl.
*G06F 21/62*    (2013.01)
*G06F 3/0484*    (2013.01)
*G06F 17/30*    (2006.01)

(52) U.S. Cl.
CPC ...... *G06F 21/6218* (2013.01); *G06F 3/04845* (2013.01); *G06F 17/30268* (2013.01)

(58) Field of Classification Search
CPC ............. G06F 21/6218; G06F 3/04845; G06F 17/30268
See application file for complete search history.

(56) References Cited

U.S. PATENT DOCUMENTS

| | | | |
|---|---|---|---|
| 6,011,864 A | 1/2000 | Wu et al. | |
| 7,660,464 B1 * | 2/2010 | Peterson | G06T 5/50 382/181 |
| 8,341,195 B1 * | 12/2012 | Cole | G06Q 30/02 705/51 |
| 8,532,377 B2 | 9/2013 | Skaff et al. | |
| 8,775,424 B2 | 7/2014 | Skaff et al. | |
| 9,111,413 B2 | 8/2015 | Gagner et al. | |
| 9,219,830 B1 | 12/2015 | Ciorba et al. | |

(Continued)

OTHER PUBLICATIONS

"First Action Interview Office Action", U.S. Appl. No. 14/938,660, dated Aug. 17, 2017, 3 pages.

(Continued)

*Primary Examiner* — Mandrita Brahmachari
(74) *Attorney, Agent, or Firm* — Wolfe-SBMC

(57) ABSTRACT

Content creation collection and navigation techniques and systems are described. In one example, a representative image is used by a content sharing service to interact with a collection of images provided as part of a search result. In another example, a user interface image navigation control is configured to support user navigation through images based on one or more metrics. In a further example, a user interface image navigation control is configured to support user navigation through images based on one or more metrics identified for an object selected from the image. In yet another example, collections of images are leveraged as part of content creation. In another example, data obtained from a content sharing service is leveraged to indicate suitability of images of a user for licensing as part of the service.

20 Claims, 16 Drawing Sheets

(56) References Cited

U.S. PATENT DOCUMENTS

| | | | |
|---|---|---|---|
| 9,449,521 B2 | 9/2016 | Dahlkvist et al. | |
| 9,483,159 B2 | 11/2016 | Myslinski | |
| 9,569,697 B1* | 2/2017 | McNerney | G06K 9/6267 |
| 9,594,807 B2 | 3/2017 | Rappoport et al. | |
| 9,818,044 B2 | 11/2017 | Koch et al. | |
| 9,916,538 B2 | 3/2018 | Zadeh et al. | |
| 2002/0118210 A1 | 8/2002 | Yuasa et al. | |
| 2003/0084065 A1* | 5/2003 | Lin | G06F 17/30265 |
| 2004/0085330 A1* | 5/2004 | Walker, Jr. | G06T 11/00 |
| | | | 345/630 |
| 2005/0030315 A1* | 2/2005 | Cohen | G06T 11/60 |
| | | | 345/538 |
| 2005/0080771 A1 | 4/2005 | Fish | |
| 2009/0119756 A1* | 5/2009 | Acuna | G06Q 20/02 |
| | | | 726/5 |
| 2009/0287657 A1 | 11/2009 | Bennett | |
| 2010/0296748 A1* | 11/2010 | Shechtman | G06T 11/00 |
| | | | 382/254 |
| 2011/0101104 A1 | 5/2011 | Flynn et al. | |
| 2011/0102544 A1 | 5/2011 | Kim | |
| 2011/0184950 A1 | 7/2011 | Skaff et al. | |
| 2011/0263946 A1 | 10/2011 | el Kaliouby et al. | |
| 2012/0054638 A1 | 3/2012 | Ingoldby et al. | |
| 2012/0163710 A1 | 6/2012 | Skaff et al. | |
| 2012/0257814 A1* | 10/2012 | Kohli | G06T 5/005 |
| | | | 382/154 |
| 2012/0317657 A1 | 12/2012 | Glimcher et al. | |
| 2013/0019257 A1* | 1/2013 | Tschernutter | H04N 21/234309 |
| | | | 725/4 |
| 2013/0070050 A1 | 3/2013 | Ha et al. | |
| 2013/0546277 | 9/2013 | Moseley et al. | |
| 2014/0108931 A1 | 4/2014 | Howard et al. | |
| 2014/0129942 A1 | 5/2014 | Rathod | |
| 2014/0177966 A1 | 6/2014 | Hamid et al. | |
| 2014/0201126 A1 | 7/2014 | Zadeh et al. | |
| 2014/0211034 A1 | 7/2014 | Tanaka | |
| 2014/0229873 A1 | 8/2014 | Tremblay et al. | |
| 2014/0333739 A1* | 11/2014 | Yang | H04N 13/0011 |
| | | | 348/54 |
| 2015/0116353 A1* | 4/2015 | Miura | G06T 11/60 |
| | | | 345/632 |
| 2015/0193507 A1 | 7/2015 | Rappoport et al. | |
| 2015/0279224 A1 | 10/2015 | Dahlkvist et al. | |
| 2015/0324394 A1 | 11/2015 | Becker et al. | |
| 2016/0055237 A1* | 2/2016 | Tuzel | G06F 17/30707 |
| | | | 382/224 |
| 2016/0259992 A1 | 9/2016 | Knodt et al. | |
| 2017/0011489 A1 | 1/2017 | Van Leeuwen et al. | |
| 2017/0131876 A1 | 5/2017 | Koch et al. | |
| 2017/0131877 A1 | 5/2017 | Koch et al. | |
| 2017/0132252 A1 | 5/2017 | Koch et al. | |
| 2017/0132290 A1 | 5/2017 | Koch et al. | |
| 2017/0132490 A1 | 5/2017 | Koch et al. | |

OTHER PUBLICATIONS

"Pre-Interview Communication", U.S. Appl. No. 14/938,628, Mar. 22, 2017, 3 pages.

"Pre-Interview Communication", U.S. Appl. No. 14/938,628, Apr. 3, 2017, 3 pages.

"Pre-Interview Communication", U.S. Appl. No. 14/938,660, Apr. 7, 2017, 3 pages.

"Non-Final Office Action", U.S. Appl. No. 14/938,781, dated Mar. 10, 2017, 9 pages.

"First Action Interview Office Action", U.S. Appl. No. 14/938,628, dated Jul. 26, 2017, 3 pages.

"Notice of Allowance", U.S. Appl. No. 14/938,781, dated Jul. 12, 2017, 7 pages.

"Final Office Action", U.S. Appl. No. 14/938,628, dated Dec. 7, 2017, 28 pages.

"Final Office Action", U.S. Appl. No. 14/938,660, dated May 8, 2018, 30 pages.

"Non-Final Office Action", U.S. Appl. No. 14/938,628, dated May 10, 2018, 27 pages.

"Non-Final Office Action", U.S. Appl. No. 14/938,660, dated Jul. 6, 2018, 34 pages.

"Non-Final Office Action", U.S. Appl. No. 14/938,690, dated Feb. 15, 2018, 20 pages.

"Non-Final Office Action", U.S. Appl. No. 14/938,752, dated Jun. 29, 2018, 29 pages.

"Notice of Allowance", U.S. Appl. No. 14/938,628, Dec. 11, 2018, 10 pages.

"Final Office Action", U.S. Appl. No. 14/938,690, Nov. 02, 2018, 19 pages.

"Final Office Action", U.S. Appl. No. 14/938,752, Dec. 14, 2018, 46 pages.

\* cited by examiner

CONTENT SHARING COLLECTIONS AND NAVIGATION

BACKGROUND

Content sharing services have been developed as a technique to provide an online marketplace for creative professionals to sell content, such as images. A creative professional, for instance, may capture or create images that are exposed via the content sharing services to potential customers such as marketing professionals, casual users, and so on. In one such example, a creative professional captures an image of a coworkers conversing next to a watercooler. The image is then uploaded and tagged for availability as part of the content sharing service such that a marketing professional performing a search for "office" and "watercooler" may locate the image. The content sharing service also includes functionality to make the image available for licensing in response to payment of a fee, e.g., as part of a subscription service, pay per use, and so forth.

When creating content that is to be made available via the content sharing service, creative professionals often create a multitude of similar content items in order to create one or more that will actually be made available for sharing. For example, a photographer may capture photos of an item (e.g., a shoe) against a white background from a variety of different angles, using different lighting, and so on. Using conventional techniques, the creative professional then makes a best guess as to which photo has the greatest likelihood of being of interest to users of the content sharing service and uploads that photo to the content sharing service for licensing.

Users of the content sharing service, however, may disagree with the creative professionals best guess and actually desire a different version of the photo, e.g., captured from different angles, different lighting. Thus, these conventional techniques are generally inefficient and subject to error due to this reliance on guesswork and the varied tastes of users of the content sharing service. Further, these conventional techniques abandon potentially useful information that may be made available from the collection in order to process images in the collection.

SUMMARY

Content creation collection and navigation techniques and systems are described. In one example, a representative image is used by a content sharing service to interact with a collection of images provided as part of a search result. In another example, a user interface image navigation control is configured to support user navigation through images based on one or more metrics. In a further example, a user interface image navigation control is configured to support user navigation through images based on one or more metrics identified for an object selected from the image. In yet another example, collections of images are leveraged as part of content creation. In another example, data obtained from a content sharing service is leveraged to indicate suitability of images of a user for licensing as part of the service.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
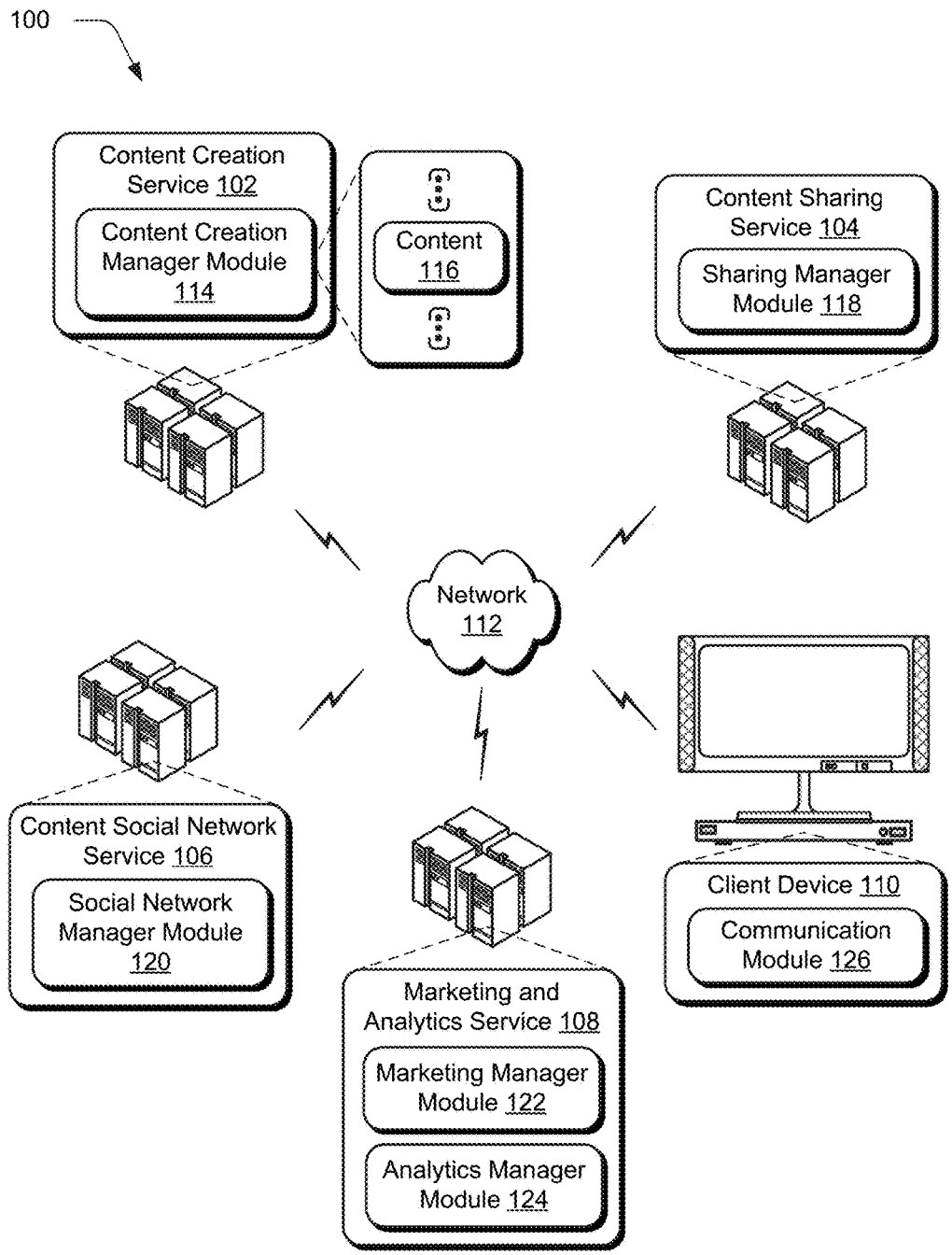
FIG. 1 is an illustration of an environment in an example implementation that is operable to employ content sharing collection and navigation techniques described herein.

Content sharing services are provided via a digital medium environment to unite content from creative professionals with consumers of the content, such as marketers. An example of this is the content sharing service is Adobe Stock™ by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two.

As part of creation of content to be shared via the content sharing services, creative professionals often generate a multitude of versions of the content, such as to capture a variety of images of an object from different angles, in different lighting conditions, using different capture settings, and so on. In conventional examples, the creative professional then makes a best guess as to which images may be of interest to users, and uploads the images (oftentimes a single image) to the content sharing service so that it is available for licensing. As described above, however, users may actually desire one of the other versions that are not made available by the creative professional and thus there is a disconnect between the perceptions of what the creative professional thinks "users want" with the actual desires of the users.

To solve these and other challenges of conventional content sharing services, techniques and systems are described herein involving collections of content (e.g., images, audio data such as music, videos) and navigation through the collections of content. In one example, a content sharing service includes functionality to provide an indication of suitability of images in a user's collection for upload and sharing via the content sharing service. This indication may be generated in a variety of ways, such as based on shared image characteristics (e.g., filters, "look and feel") with images actually licensed from the content sharing service, shared subject matter (e.g., both pertain to shoes) with images actually licensed from the content sharing service, a determination of image quality (e.g., contrast, color, composition such as following the "rule of threes"), and so forth. In this way, a user may be guided in a process of determining which images to upload and thus increase a likelihood that those images will be licensed, further discussion of which is described in relation to FIGS. 13 and 14.

In another example, images of a collection are made available via a content sharing service, but represented with a single image. Rather than overwhelm a search result with a multitude of similar images, the content sharing service may utilize a single representative image that is selectable to interact with the collection. The representative image may be chosen automatically by the content sharing service responsive to a determination that the images exhibit at least a threshold amount of similarity. Thus, a user is exposed to a variety of different images without complicating a display in a search result but still have access to other images in the collection, thereby increasing a likelihood that a user finds a version of the image of interest, further discussion of which is included in a description of FIGS. 2-4.

In a further example, a control is configured to support navigation through the plurality of similar images. The control may be configured as a slider that is used to navigate through the images based on a differentiation of a determined similarity of the images. For instance, a determination is first made that the images involve different views of an object. Accordingly, the slider is configured to navigate through images based on similarity of the views, one to another, and in a way that that a user may view differences in this similarity. Further, techniques are described in which navigation through images is based on an object selected by a user. Further discussion of these examples is described in relation to FIGS. 5-9.

In yet another example, a collection of images is used to support image creation functionality. Accuracy of some image measurement characteristics, such as inference of light sources, generation of depth maps, optical flows, and so forth may be greatly enhanced with the use of similar images, such as images taken from multiple views. In conventional content sharing services, a single image was typically provided and thus this functionality was not made available to a user, even if such images were captured by a creative professional. Accordingly, techniques are described that are used to obtain these images as part of content creation in instances in which these images may improve accuracy of the content creation functionality, further discussion of which is included as part of description of FIGS. 10-12 in the following.

In the following discussion, an example environment is first described that is configured to employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. A digital medium environment is illustrated that is configured to generate and control suggestions usable to guide content creation. The illustrated environment 100 includes a content creation service 102, a content sharing service 104, a content social network service 106, a marketing and analytics service 108, and a client device 110 that are communicatively coupled, one to another, via a network 112. Although illustrated separately, functionality represented by the content creation service 102, the content sharing service 104, the content social network service 106, and the marketing and analytics service 108 are also combinable into a single entity, may be further divided across other entities that are communicatively coupled via the network 112, and so on.

Computing devices that are used to implement the content creation service 102, the content sharing service 104, the content social network service 106, the marketing and analytics service 108, and the client device 110 are configurable in a variety of ways. Computing devices, in one such instance, are configured as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown in some instances, computing devices are also representative of a plurality of different devices, such as multiple servers utilized by a business to perform operations "over the cloud" as shown for the content creation service 102, the content sharing service 104, the content social network service 106, the marketing and analytics service 108, further discussion of which may be found in relation to FIG. 16.

The content creation service 102 is illustrated as including a content creation manager module 114 that is representative of functionality that is available via the network 112 to create and store content 116. The content creation manager module 114 provides a variety of functionality that is related to the creation of content 116. Examples of this functionality include graphic design, video editing, web development, image creation and processing, sound data processing, photography, and so forth. For example, functionality supported by the content creation manager module 114 includes digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth.

The content sharing service 104 includes a sharing manager module 118. The sharing manager module 118 is representative of functionality to unite content of creative professionals with consumers of the content, such as marketers, via an online service. An example of this is the content sharing service Adobe Stock® by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two. Functionality of the sharing manager module 118 may include support of searches to locate desired images, pricing techniques, digital rights management (DRM), and generation of content creation suggestions.

The content social network service 106 as illustrated includes a social network manager module 120 that is representative of functionality to implement and manage a content social network service. An example of this is an online social-media based portfolio service for content creators (e.g., Behance®) that is usable by consumers to locate content professionals through examples of content created by the professionals.

The environment 100 also includes a marketing and analytics service 108. The marketing and analytics service 108 includes a marketing manager module 122 that is representative of functionality involving creation and tracking of marketing campaigns and the analytics manager module 124 is representative of functionality to analyze "big data," e.g., posts from a social network service. For example, marketing activities may be utilized to increase awareness of a good or service. This includes making potential consumers aware of the good or service as well as making the potential consumers aware of characteristics of the good or service, even if the potential consumers already own the good. An advertiser, for instance, generates a marketing activity to indicate functionality that is available from the good or service to increase usage and customer satisfaction.

Marketing activities take a variety of different forms, such as online marketing activities may involve use of banner ads, links, webpages, online videos, communications (e.g., emails, status posts, messaging), and so on that may be accessed via the Internet or otherwise. Marketing activities are also be configured for use that does not involve the Internet, such a physical fliers, television advertising, printed advertisements, billboard display (e.g., at a sporting event or along a side of a road), and so forth.

The marketing manager module 122 includes functionality to configure content 116 for inclusion as part of a marketing activity as well as track deployment of the content 116 as part of the marketing activity. The marketing manager module 122, for instance, may embed digital rights management functionality (e.g., a tracking monitor) to track the deployment of the content 116, e.g., to determine a number of times accessed by potentials customers, how and when accessed, identities of who accessed the content, and so forth as processed by the analytics manager module 124.

The client device 110 is illustrated as including a communication module 126 that is representative of functionality to access the content creation service 104, content sharing service 104, content social network service 106, marketing and analytics service 108, and/or content 116 (e.g., available at an online store) via the network 112. The communication module 126, for instance, may be configured as a browser, a web-enabled application, and so on. As such the client device 110 may be utilized by creative professionals to create the content 116, consumers of the content sharing service 104 to gain rights to use the content 116 (e.g., marketers), consume the content 116 (e.g., as part of viewing a marketing activity), and so forth. A variety of other arrangements of functionality represented by the entities of the environment 100 of FIG. 1 are also contemplated without departing from the spirit and scope thereof. Having now described an environment that is usable to implement the techniques described herein, examples of the content creation and sharing integration are described in the following.

Content Sharing Collection Representations

Figure 2:
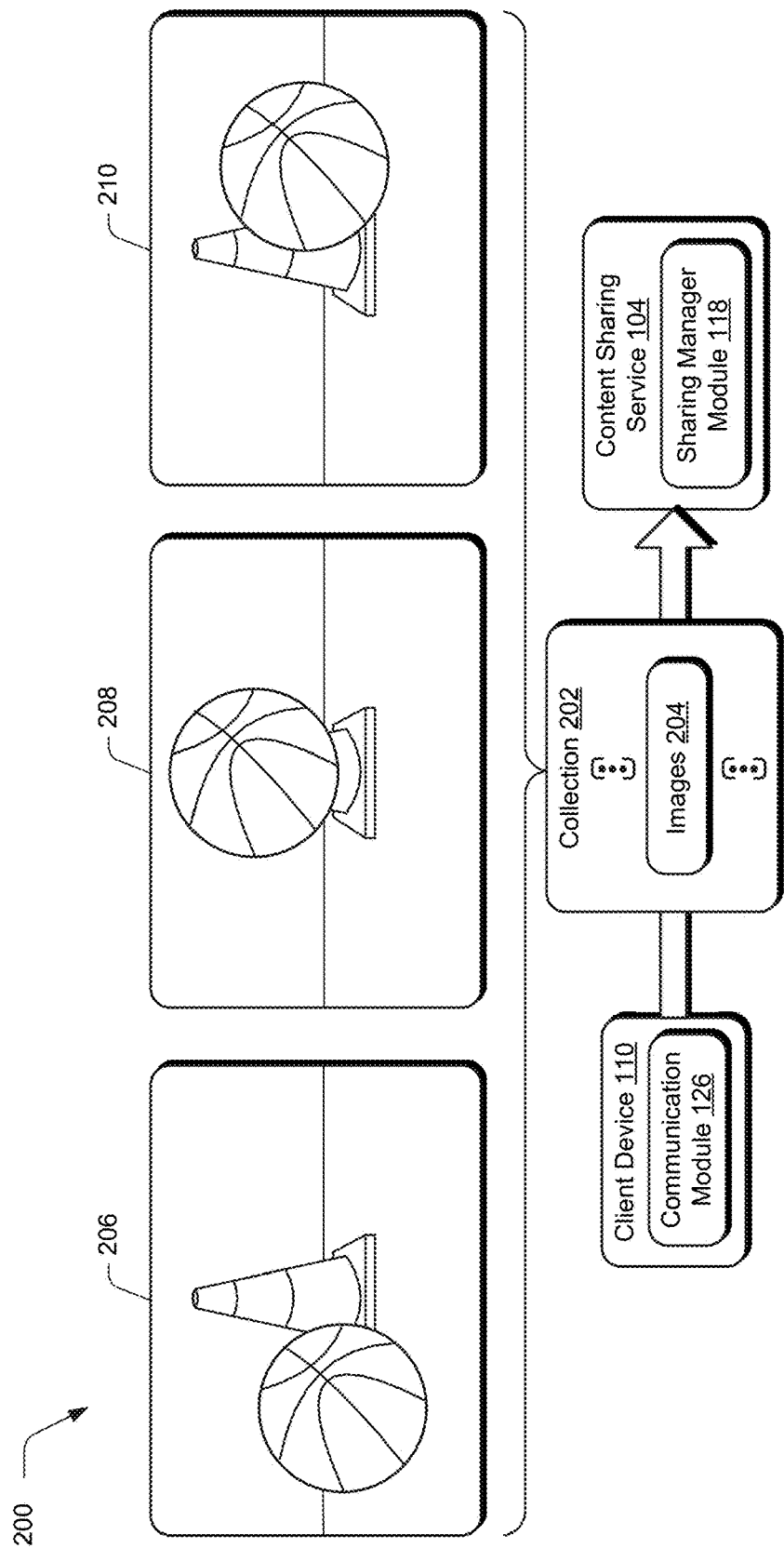
FIG. 2 depicts an example system.
Figure 3:
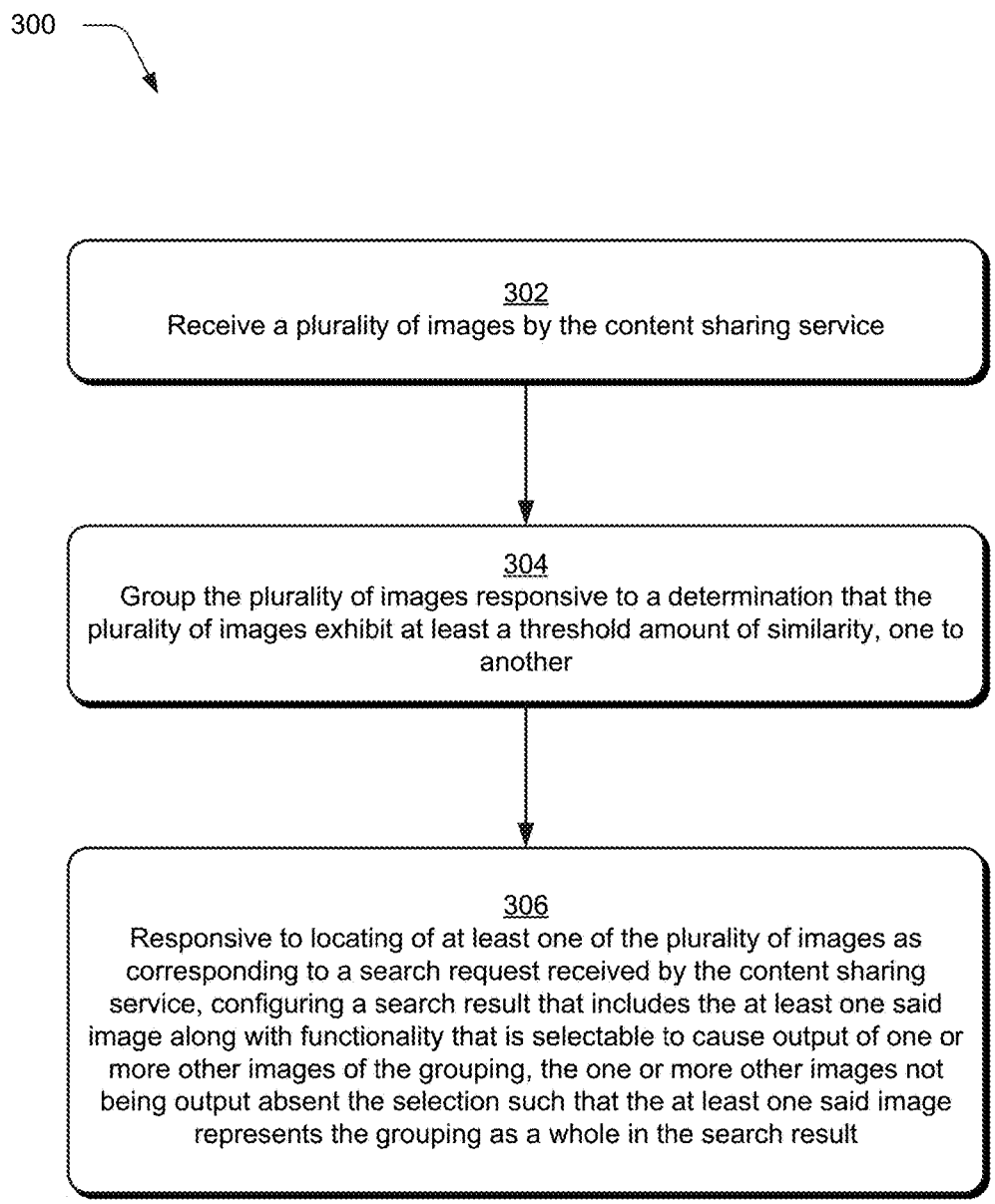
FIG. 3 depicts an example procedure.
Figure 4:
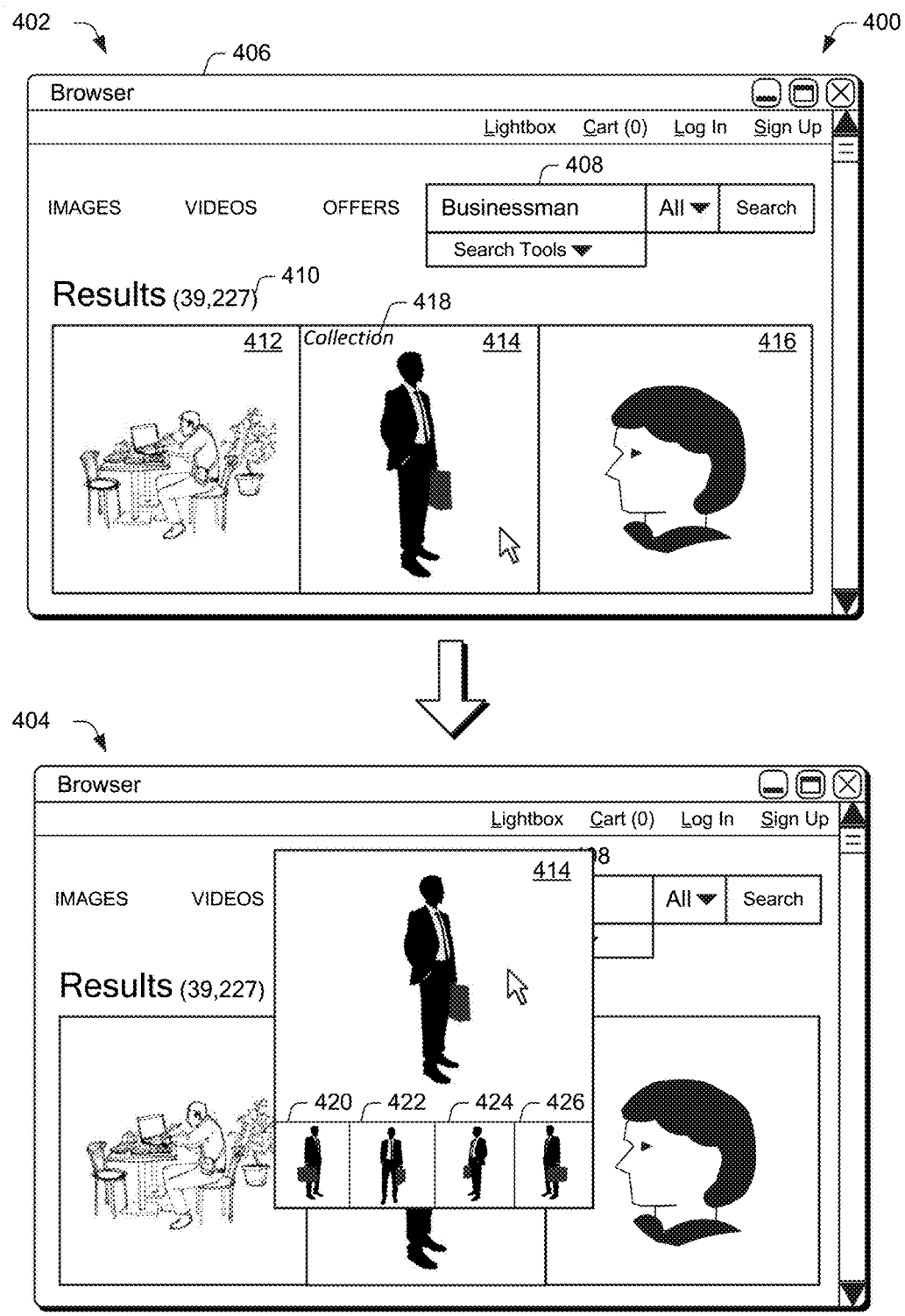
FIG. 4 depicts an example implementations of user interfaces in which a representative image is used by a content sharing service to interact with a collection of images provided as part of a search result.

FIG. 2 depicts an example system 200, FIG. 3 depicts an example procedure 300, and FIG. 4 depicts an example implementations 400 of user interfaces in which a representative image is used by a content sharing service to interact with a collection of images provided as part of a search result. In this way, a user is exposed to a variety of different images without complicating a display in a search result but still have access to other images in the collection, thereby increasing a likelihood that a user finds a version of the image of interest.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

As content searches are the primary technique by which customers of a content sharing service locate desired images, accuracy of the search result is of primary importance is user satisfaction with the content sharing service. As part of this, configuration of a search results involves a balance between exposure of a customer to a wide range of images have different characteristics with slight variations of images that may be desired by the customers.

For example, a creative professional may capture tens and even hundreds of images of a single object using different lighting, perspectives, capture settings, and so forth and upload these images to the content sharing service for licensing by customers. However, in response to a search request the content sharing service balances providing a subset of the images that might not have a version that is requested by a customer with overly saturating the search result with the images and therefore limiting exposure to other images that might be of interest to the customer. Thus, conventional content sharing services may err either way, which may be frustrating to users and inefficient.

Accordingly, the content sharing service 104 in this example is configured to receive a plurality of images (block 302), an example of which is illustrated as a collection 202 of images 204 from the client device 110 via a network 112. The content sharing service 104 then groups the plurality of images responsive to a determination that the plurality of images exhibit at least a threshold amount of similarity, one to another (block 304). As shown in FIG. 2, for instance, the sharing manager module 118 of the content sharing service 104 may receive a collection 202 of images 204 and then determine similarity of the images 204, one to another, using a variety of metrics.

In the illustrated example, images 206, 208, 210 exhibit similarity as including matching objects, with differences being movement of an object (e.g., a basketball) from one image to another. This similarity may be determined in a variety of ways, such as through use of predefined metrics including color, contrast, saturation, use of similar image processing as part of a content creation service 102. Values of the predefined metrics may then be expressed as a vector in a high-dimensional space and then used to compute similarity, one to another. In this way, the vectors are usable determine whether the images 204 exhibit at least at threshold amount of similarity, one to another. In another example, the similarity determination is made through comparison of the images, one to another, such as to determine whether the images 204 have similar objects, perspectives, lighting, and so forth and thus exhibit at least at threshold amount of similarity, one to another. Other examples are also contemplated. In one or more implementations, this determination is performed offline as the images are received by the content sharing service 104. Real time examples are also contemplated in which this determination is performed as part of processing of a search result generated in response to a search request.

Responsive to location of at least one of the plurality of images 204 as corresponding to a search request received by the content sharing service, a search result is configured that includes the at least one image along with functionality that is selectable to cause output of one or more other images of the grouping. The one or more other images are not output absent the selection such that the at least one image represents the grouping as a whole in the search result (block 306). An example implementation 400 is shown in FIG. 4 using first and second stages 402, 404 that illustrate successive interaction with a user interface 406 that includes a search result.

At the first stage 402, a keyword 408 "businessman" has been entered as a search query in the user interface 406. In response, the sharing manager module 118 matches the search query to tags associated with images to form a search result 410 including representations of the located images that are available for licensing, illustrated examples of which include representations of images 412, 414, 416.

Image 414, however, represents a collection of images as previously described, and includes an indication 418 representing this. The image 414 is selectable as shown at the second stage 404 to cause output of the image along with one or more additional representations of images 420, 422, 424, 426 from the group. In this way, the search result 410 is configured to supply a diverse range of images in the search result 410. Additionally, if one of the images is of interest, a user is able to select the image to cause output of similar images taken from a group, which involve different orientations of an object (e.g., the businessman) in this example.

For instance, a user may perform a search for a "businessman" for use in marketing materials and view image 414. However, the user may desire an orientation of the business as facing left rather than right. Thus, although the image 414 is close to the user's desired image it isn't "quite right." Through selection of the representation of this image 414, however, images having different orientations of the businessman are output and selectable by a user for licensing and thus a user may then navigate this similar images to locate one of interest. In this way, the content sharing service is able to promote balance between overinclusion of similar images and awareness of those images. User interface controls may also be employed to promote efficient navigation through the similar images based on this similarity, an example of which is described in the following.

Content Navigation Control

Figure 5:
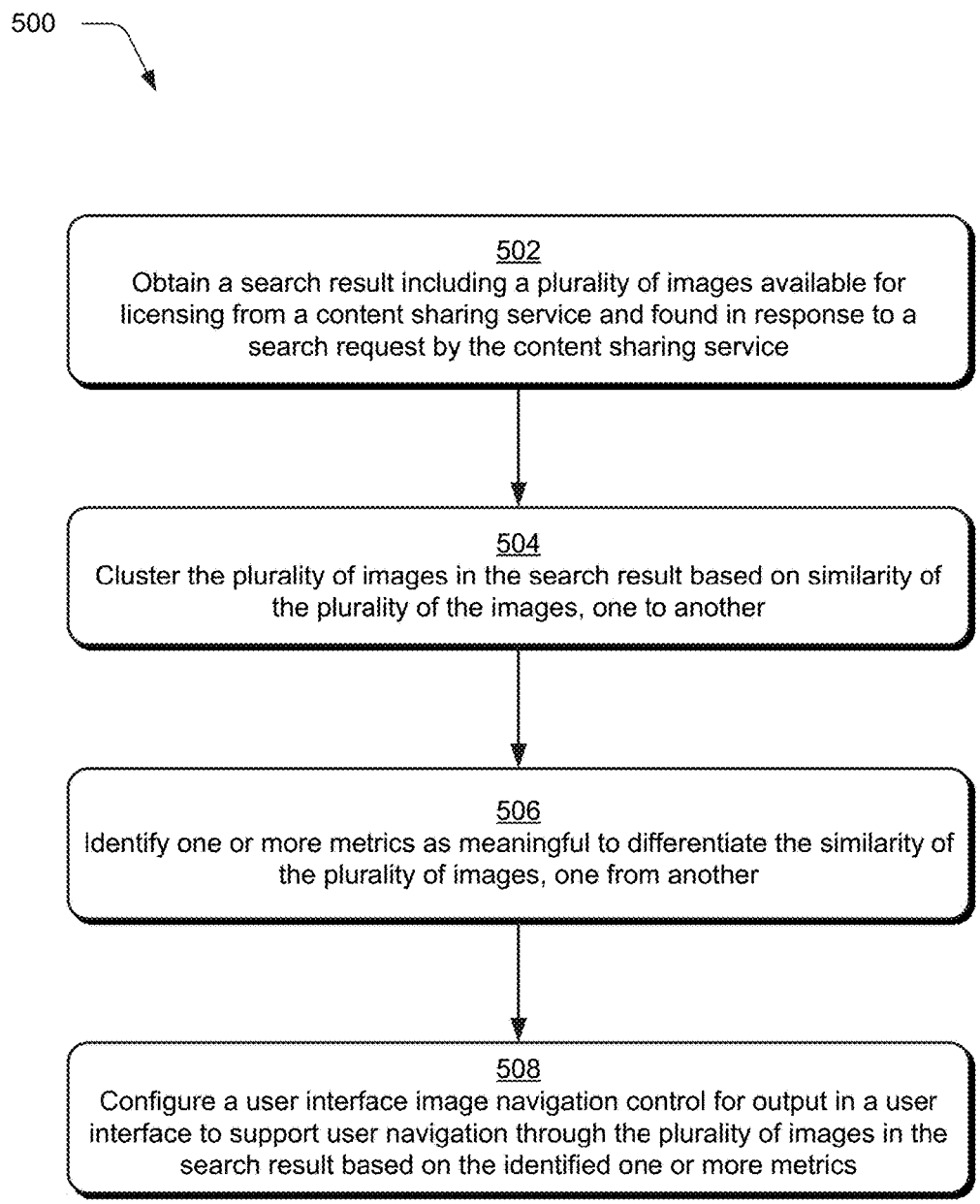
FIG. 5 depicts an example procedure.
Figure 6:
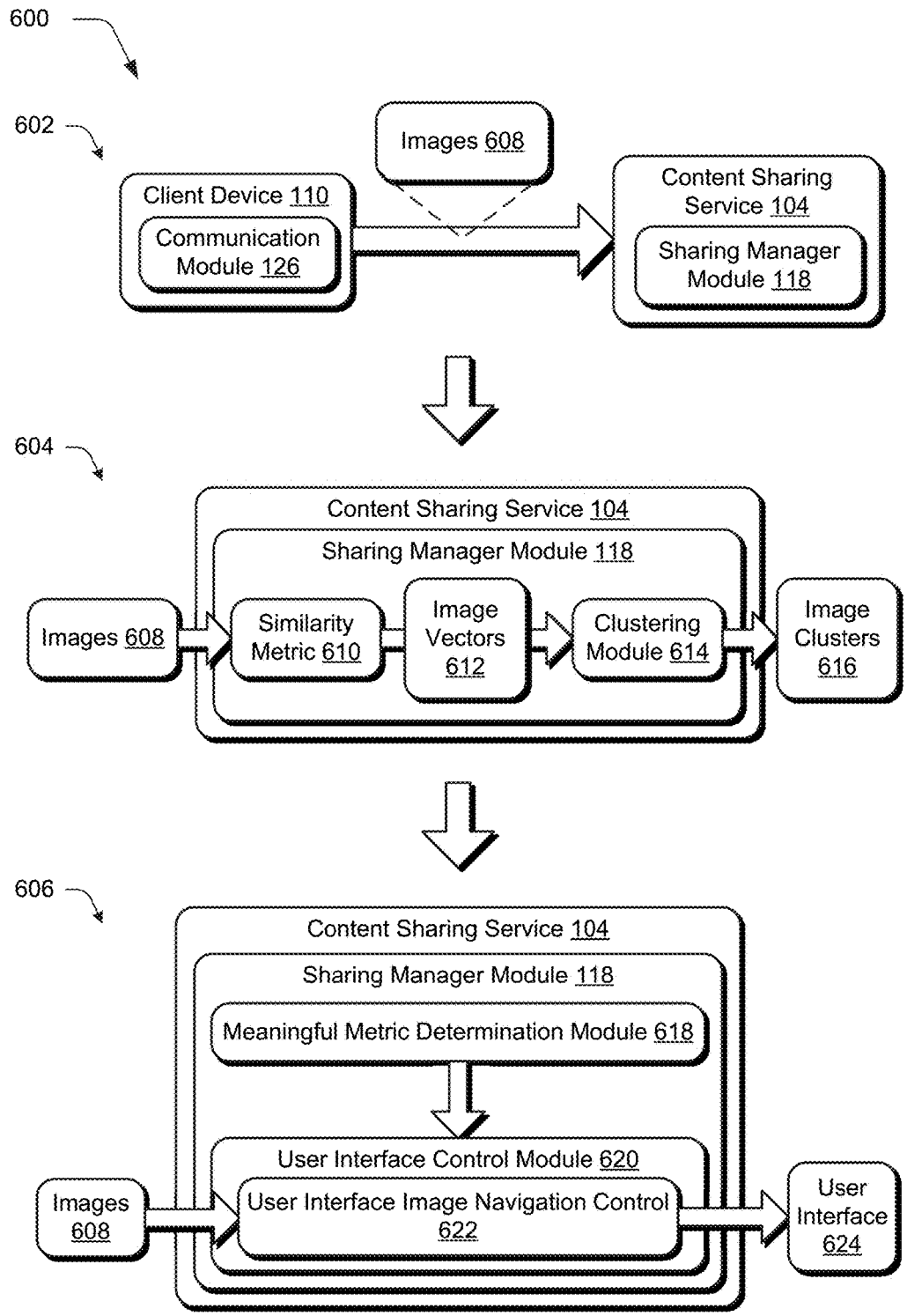
FIG. 6 depicts an example system.
Figure 7:
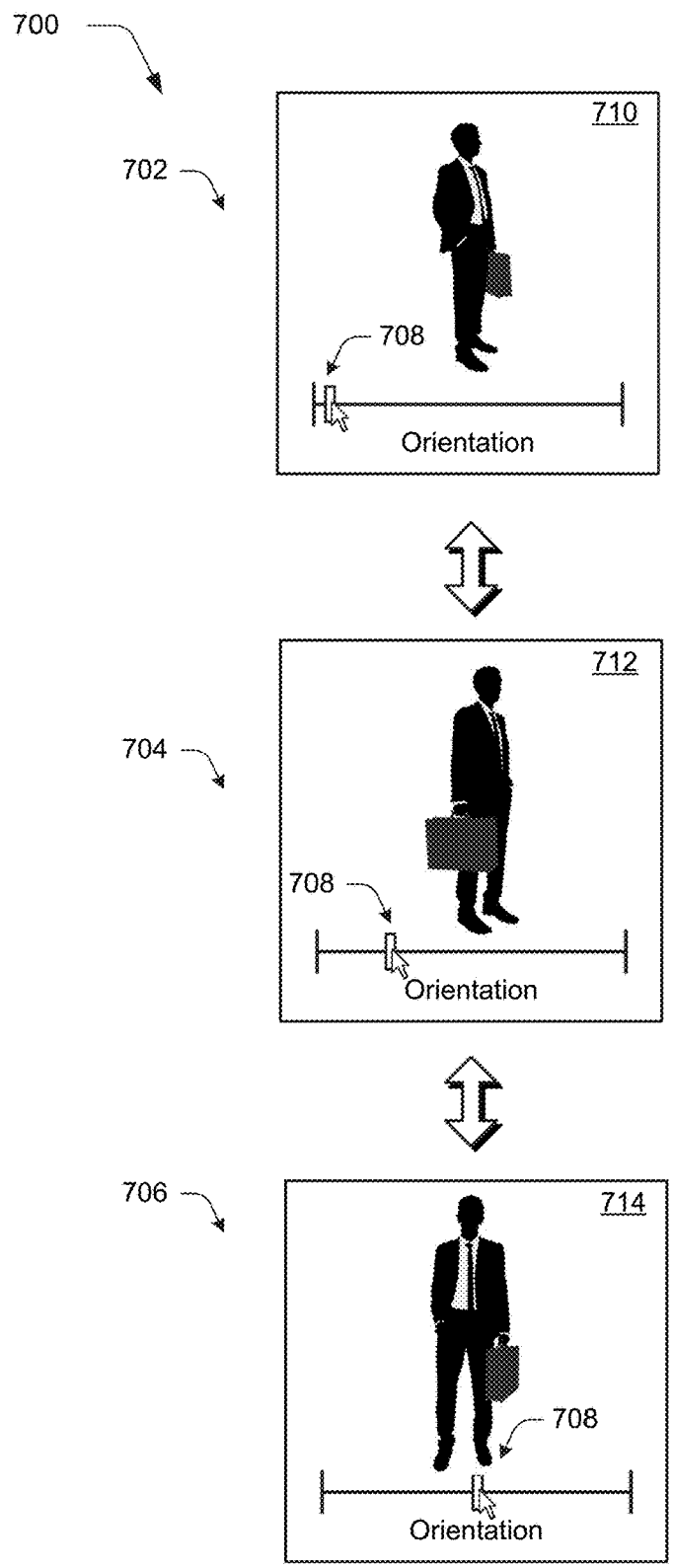
FIG. 7 depicts an example implementation of user interfaces in which a user interface image navigation control is configured to support user navigation through images based on one or more metrics.

FIG. 5 depicts an example procedure 500, FIG. 6 depicts an example system 600, and FIG. 7 depicts an example implementations 700 of user interfaces in which a user interface image navigation control is configured to support user navigation through images based on one or more metrics. In this way, a user is able to efficiency navigate through similar images based on a metric that is identified to differentiate the similarity of the images, one from another.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

A user's perception of search results is a driving factor in how the user perceives interaction with a content sharing service 104 as a whole. Thus, configuration of the search results has a direct effect on both a customer's ability to locate images of interest for licensing as well as a creative professional's ability to license the images.

In this section, techniques are described to cluster images in a search result and configure a user interface image navigation control to navigate through the images. FIG. 6, for instance, illustrates an example system 600 using first, second, and third stages 602, 604, 606. At the first stage 602, images 608 are uploaded to the content sharing service 104 by a client device 110 via a network 112.

At the second stage 604, the images 608 are processed by the sharing manager module 118 to determine similarity, one to another. This is performed in this example through use of a similarity metric 610 to form image vectors 612 that are then clustered by a clustering module 614 to form image cluster 616. The similarity metrics 610, for instance, are used to describe different characteristics of images, such as color, saturation, objects included in the image (e.g., landscape, people), contrast, and so forth. This is expressed as an image vector 612 for respective images 608 in which values for these metrics in the vector are expressed in a multidimensional space. Accordingly, the image vectors 612 for each of the images 608 are then used by the clustering module 614 to cluster the plurality of images based on similarity of the images 608, one to another.

The clustering may be performed in a variety of ways. In one such example, the clustering is performed offline as images are received to tag images for use in an image search. In this way, the clustering may be performed for a search query offline such that a search may be quickly generated when received from a user. In another such example, the clustering is performed in real time.

Regardless of how performed, a search result is obtained that includes a plurality of images available for licensing from a content sharing service and found in response to a search request by the content sharing service (block 502). The plurality of images are then clustered in the search result based on similarity of the plurality of images, one to another (block 504). Thus, at this point the content sharing service 104 has determined which images 608 are similar as defined by image clusters 616 at the second stage 604 of FIG. 6.

In order to support navigation through these similar images, one or more metrics are then identified as meaningful to differentiate the similarity of the plurality of images, one from another (block 506). A user interface image navigation control is then configured for output in a user interface to support user navigation through the plurality of images in the search result based on the identified one or more metrics (block 508). As shown at the third stage 606 of FIG. 6, for instance, the sharing manager module 118 includes a meaningful metric determination module 618 that is representative of functionality to determine a metric that is meaningful to differentiate between the similar images as indicated by the clusters. This metric is then used to configure a user interface image navigation control 622 for output in a user interface 624 to support user interaction to navigate through the images based on this metric.

FIG. 7 depicts an example implementation 700 of this involving user interaction with a user interface image navigation control 622. This example implementation is illustrated using first, second, and third stages 702, 704, 706. The user interface image navigation control 622 is configured as a slider 708 in this instance to navigate through different images 710, 712, 714 through corresponding movement of the slider 708. Thus, in this example the images 710, 712, 714 are clustered as having a similar object, e.g., a businessman, and thus this object is used to determine similarity of the images 710, 712, 714, one to another.

A meaningful metric is also identified to differentiate the images 710, 712, 714, which in this case is orientation of the object in the images. Accordingly, the images 710, 712, 714 are then ordered based on this identified meaningful metric (e.g., similarity of orientations, one to another) and the slider 708 is used to navigate through this order. In this example, the meaningful metric (e.g., orientation) is chosen to differentiate the basis of the similarity determination (e.g., inclusion of a particular object), although other examples are also contemplated. In this way, similar images may be efficiently located and the meaningful metric utilized to navigate through differences between these similar images. Additional examples are also contemplated as described in further detail below.

Object Navigation in Content

Figure 8:
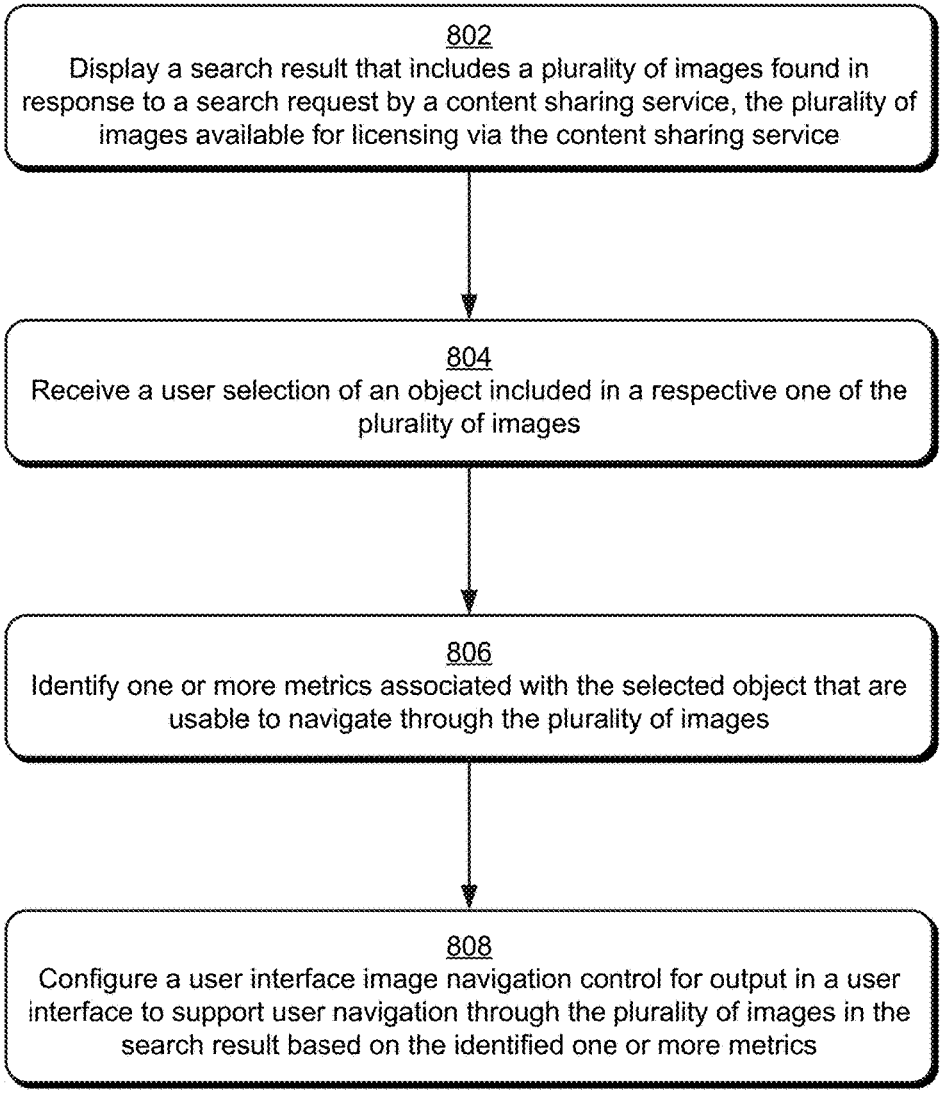
FIG. 8 depicts an example procedure.
Figure 9:
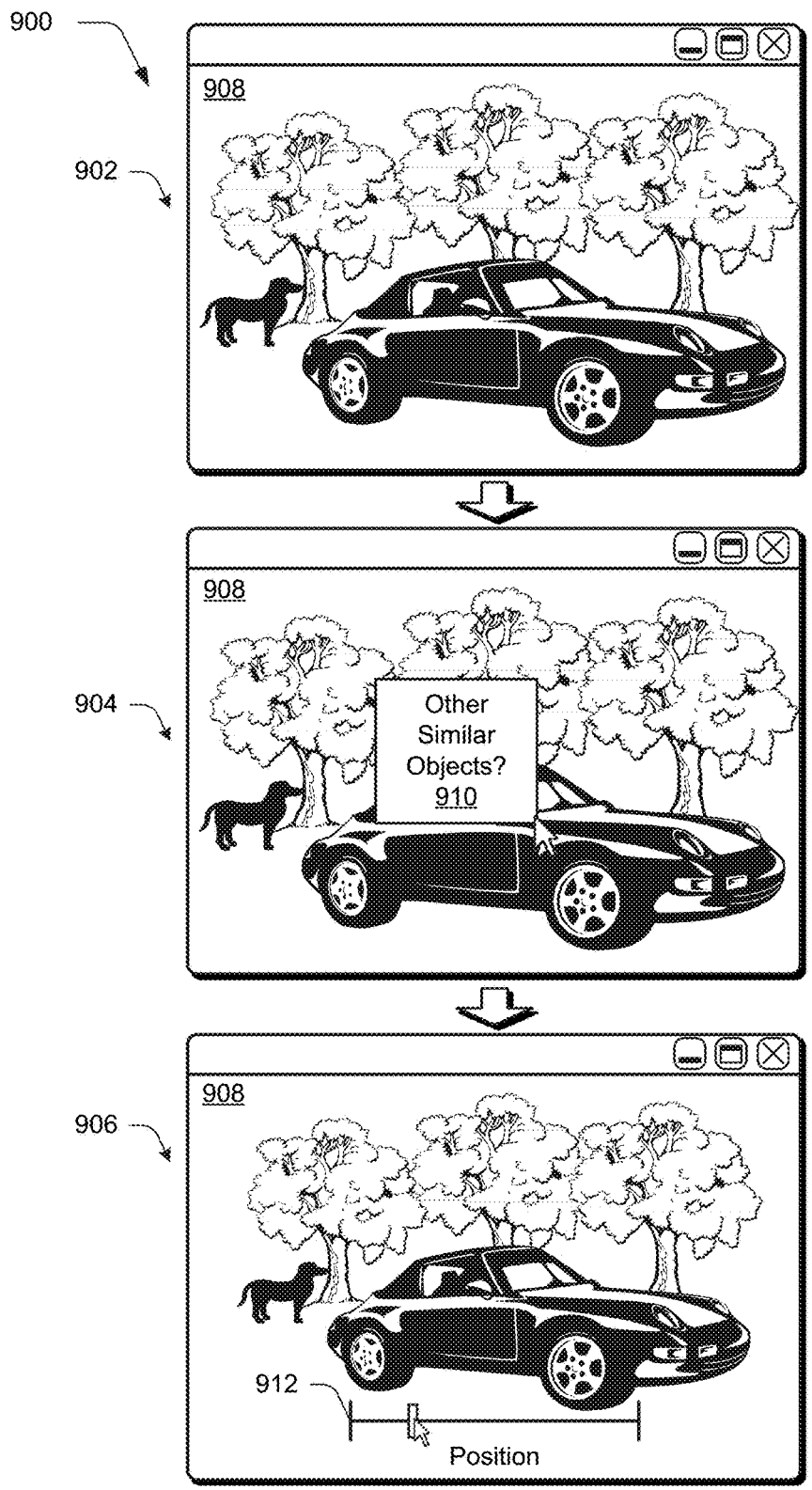
FIG. 9 depicts example implementations of user interfaces in which a user interface image navigation control is configured to support user navigation through images based on one or more metrics identified for an object selected from the image.

FIG. 8 depicts an example procedure 800 and FIG. 9 depicts example implementations 900 of user interfaces in which a user interface image navigation control is configured to support user navigation through images based on one or more metrics identified for an object selected from the image. In this way, a user is able to efficiency navigate through similar images based on the object and a similarity determination based on this object. FIG. 9 is illustrated using first, second, and third stages 902, 904, 906 to show object selection and control navigation.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

In conventional search results, users manually enter and reenter search requests using keywords to navigate image to locate an item of interest. For example, a user may initially enter a keyword "businessman" and receive search results. If a desired image is not found, the user may further refine the search request to "businessman" and "briefcase" and then to "businessman", "briefcase," and "meeting," and so forth to locate images of interest. Thus, this process may be inefficient and rely on a user's ability to formulate keywords that best express characteristics of an image desired by a user.

Techniques are described in the following, however, that leverage images returned in an image search to further refine the search. In this way, rather than solely rely on a user's ability to arrive at keywords that accurately reflect the user's desires, additional information from the images themselves is leveraged as part of the search.

To begin with in this example, a search result is displayed that includes a plurality of images found in response to a search request by a content sharing service, the plurality of images are available for licensing via the content sharing service (block 802). An example of a search result including a plurality of images is shown in FIG. 4 and a single example of such an image 908 included in a search result is shown at the first stage 902 of FIG. 9 in greater detail. In this example, a search result for a search request of "car" and "woods" is shown.

A user selection is received of an object included in a respective one of the plurality of images (block 804). As shown at the second stage 902, a user has "right-clicked" on an object (e.g., a car) in the image 908. This causes output of an option 910 to locate other similar objects. In response to selection of this option, one or more metrics are identified that are associated with the selected object and that are usable to navigate through the plurality of images (block 806). This may be performed in a variety of ways, such as through use of similarity metrics and image vectors as described in relation to FIG. 6 as calculated for the selected object in this example.

A user interface image navigation control is then configured for output in a user interface to support user navigation through the plurality of images in the search result based on the identified one or more metrics (block 808). An example of a user interface image navigation control is illustrated at the third stage 906 as a slide 912, although other examples are also contemplated such as radial dials. In the illustrated example, the metric "position" is identified as differences in position of the object (e.g., the car) in the images in the search result.

Therefore, a user is able to interact with the slider 912 to navigate through images in the search result having the car located at different positions within the image. In this way, a user is able to select "what they are looking for" and use this as a basis to further refine a search automatically and without user intervention as was previously required through manual entry of keywords. Further, the similarity is also determined automatically and without user intervention and thus a user is able to readily determine commonality of the object in the search result. Although a single control is illustrated, is should be readily apparent that a plurality of controls may also be output such that a user may select a metric of interest.

Leveraging Image Collections as Part of Content Creation

Figure 10:
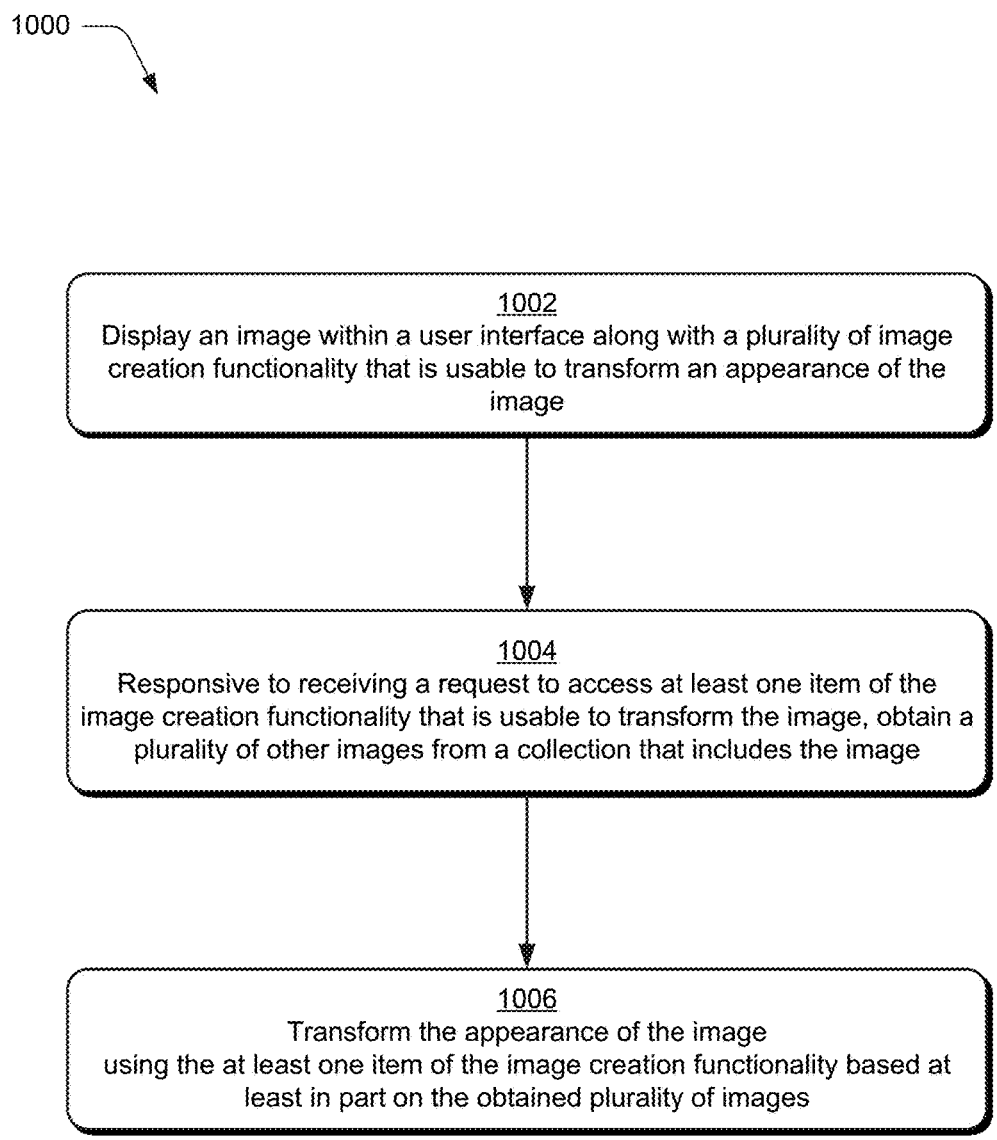
FIG. 10 depicts an example procedure.
Figure 11:
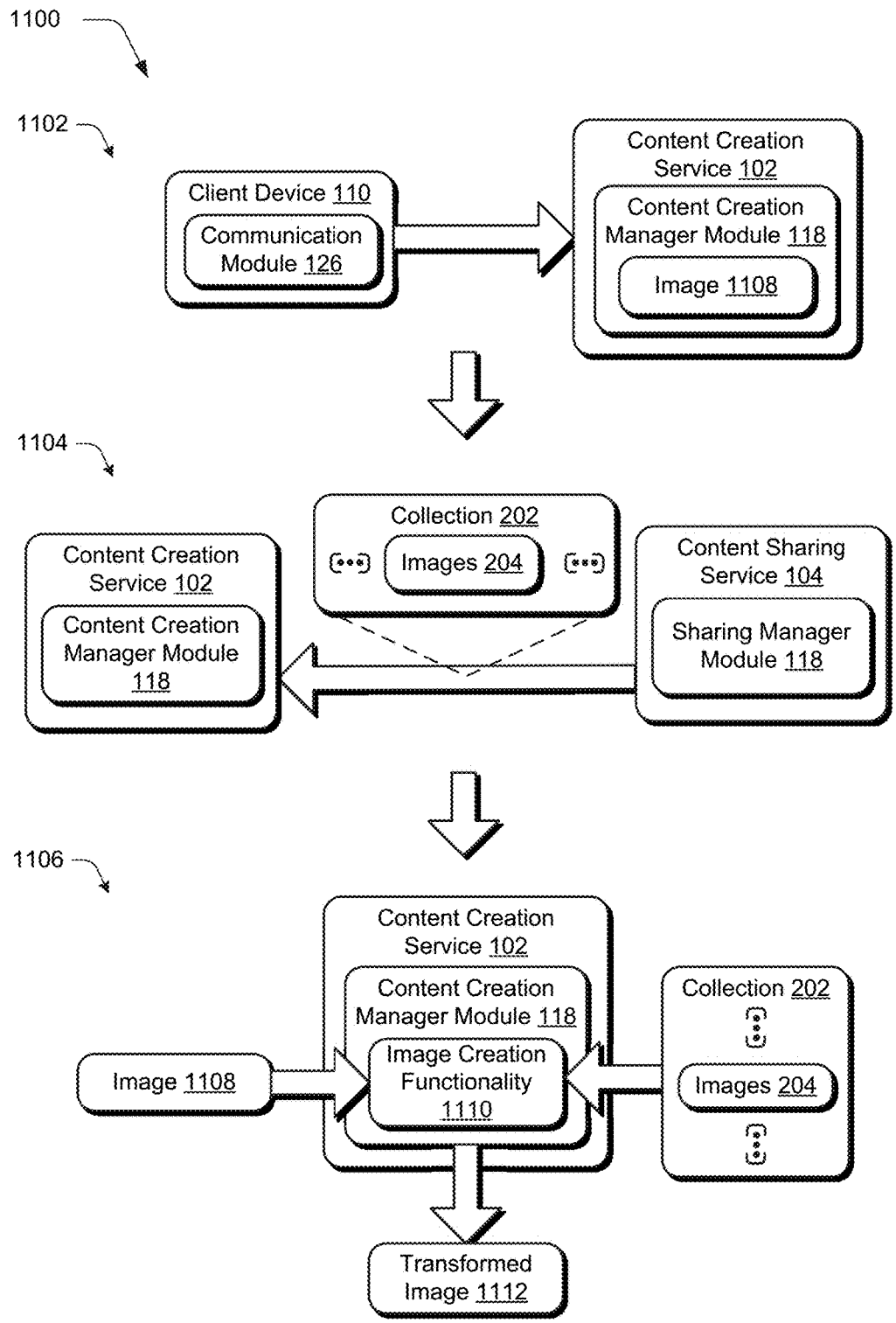
FIG. 11 depicts an example system.
Figure 12:
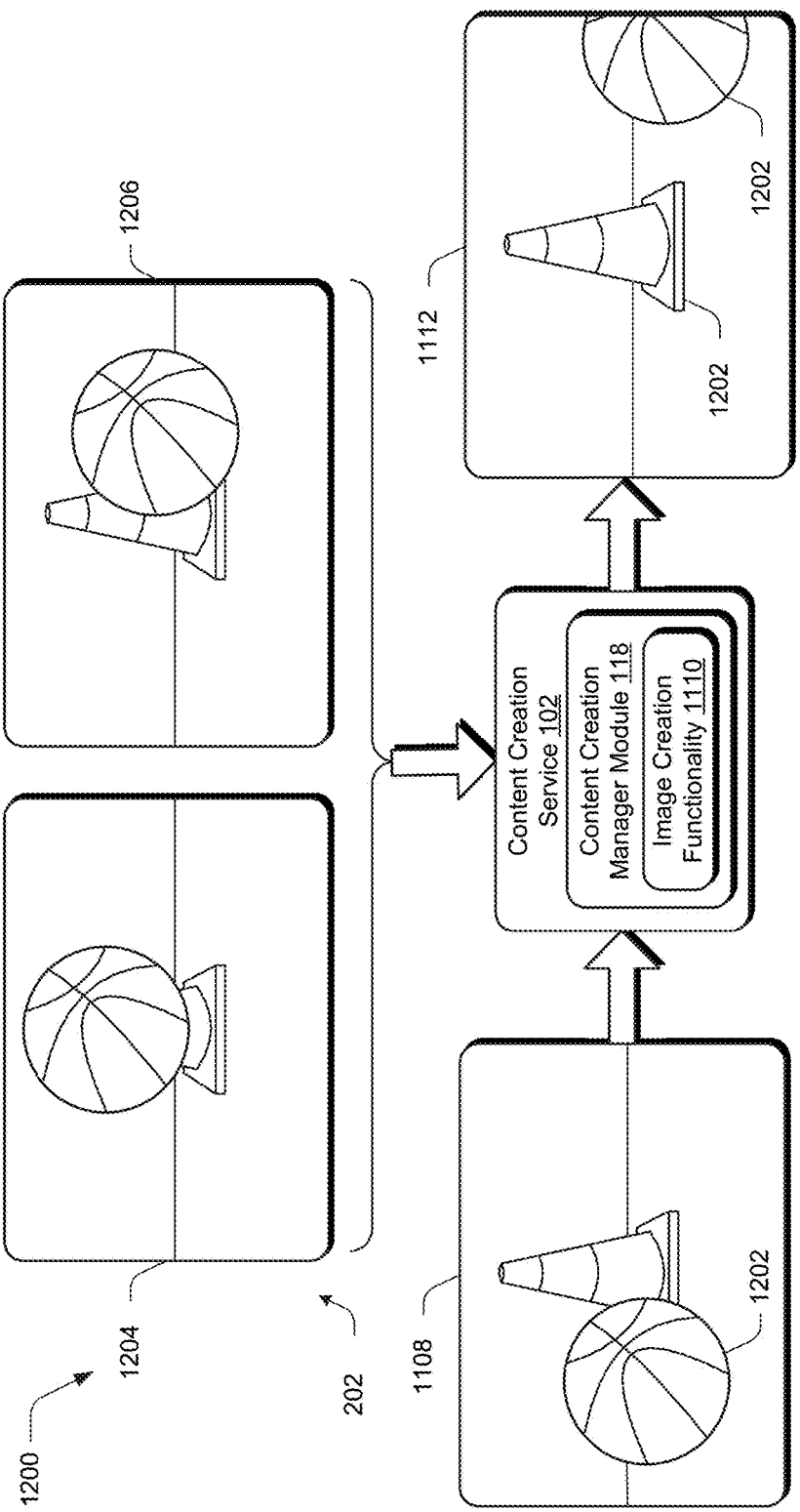
FIGS. 12 and 13 depict example implementations of user interfaces in which collections of images are leveraged as part of content creation.
Figure 13:
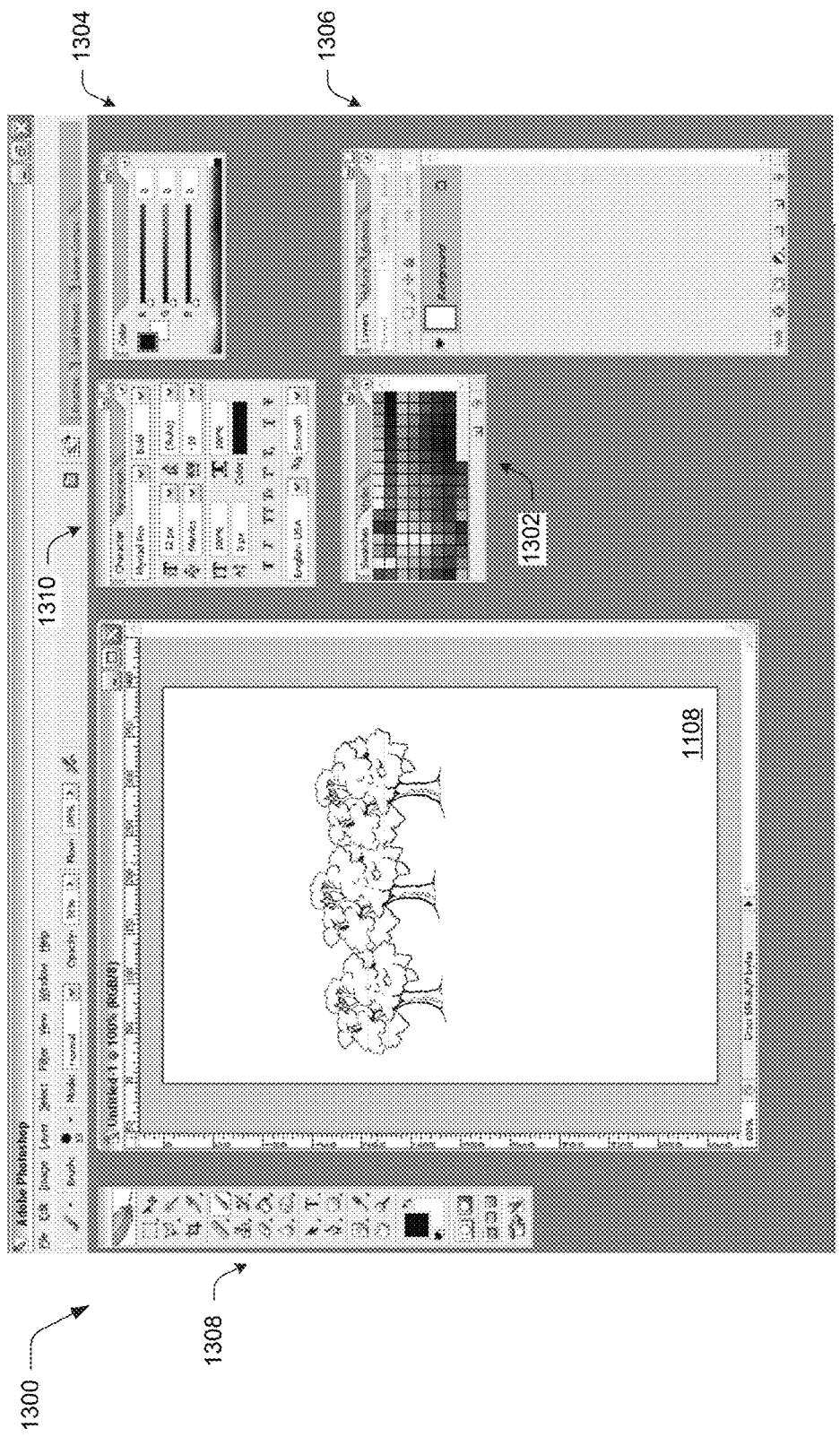

FIG. 10 depicts an example procedure 1000, FIG. 11 depicts an example system 1100, and FIGS. 12 and 13 depict example implementations 1200, 1300 of user interfaces in which collections of images are leveraged as part of content creation. In this way, efficiency and functionality available as part of content creation may be increased by leveraging other images from a collection, such as to infer light sources, hole filling, three-dimensional modeling, and so forth. FIG. 11 is illustrated using first, second, and third stages 1102, 1104, 1106 to show use of collections of images as part of content creation.

The following discussion describes techniques that may be implemented utilizing the previously described systems and devices. Aspects of the procedure may be implemented in hardware, firmware, software, or a combination thereof.

The procedure is shown as a set of blocks that specify operations performed by one or more devices and are not necessarily limited to the orders shown for performing the operations by the respective blocks.

Accuracy of some image creation techniques, such as inference of light sources, generation of depth maps, optical flows, and so forth may be greatly enhanced with the use of similar images, such as images taken from multiple views. In conventional content sharing services, a single image was typically provided and thus this functionality was not made available to a user, even if such images were captured by a creative professional. Accordingly, techniques are described that are used to obtain these images as part of content creation in instances in which these images may improve accuracy of the content creation functionality.

As shown at the first stage 1102 of FIG. 11, a creative professional interacts with a client device 110, for instance, and uses a communication module 126 to interact with a content creation manager module 118 of a content creation service 102 to employ an image 1108 as part of content creation. An image is displayed within the user interface along with a plurality of image creation functionality that is usable to transform an appearance of the image (block 1002).

FIG. 13 depicts an example implementation 1300 of such a user interface 1300 that is output through interaction with a content creation service 102 that includes image 1108 to create content, such as an advertisement, presentation, marketing campaign, and so forth. A variety of different functionality is made available via the user interface 1300 to create content. In one example, color palettes 1302 are usable to select colors used by brushes, to fill shapes, outlines, pen strokes, and so on. The user interface 1300 may also include image creation functionality to modify 1304 the colors included in the palette, such as to blend colors together, specify color temperatures, and so on.

In an additional example, the image creation functionality includes layers 1306 used as part of creating the image 1108. For example, the layers may correspond to objects of the image 1108, such as a background for the image. In this way, a user may create, interact, and modify objects individually through use of the different layers which are then displayed together (e.g., one over the other) to form the image 1108.

In yet another example, the image creation functionality includes image creation tools 1308 used to create the image 1108. Examples of such tools as shown in the user interface 1300 of FIG. 13 includes user selection tools, color selection tools, cropping tools, slicing tools, clone stamping tools, brush tools, pencil tools, gradient tools, blur tools, dodge tools, path selection tools, pen tools, foreground color change tools, and others that are configured to change, select, modify, or move pixels of the image 1108. Text 1310 tools are also included to specify fonts, line weight, and so forth.

In the above examples, the image creation functionality is applied to a single image to transform the image. However, in some instances accuracy and efficiency of image creation functionality may be aided through use of similar images. However, conventional content sharing services did not make such collections available, but rather relied on single instances of images uploaded by a creative professional. Thus, these conventional content sharing services did not leverage the tens, hundreds, and even thousands of other images captured by the creative professional in order to select these images for upload to the content sharing service 104.

A plurality of other images from a collection that includes the image are obtained responsive to receipt of a request to access at least one item of image creation functionality that is usable to transform the image (block 1004). An example of this is illustrated at the second stage 1104 of FIG. 11 in which the content creation service 102 obtains a collection 202 of images 204 from the content sharing service 104. At the third stage 1106, the appearance of the image 1108 is transformed using the at least one item of image creation functionality 1110 based at least in part on the obtained plurality of images 204 (block 1006) from the collection 202 to form a transformed image 1112.

A variety of image creation functionality 1110 is configurable to leverage the image 1108 as well as other images 204 from a collection 202. In an example illustrated in FIG. 12, for instance, hole filling is performed to "fill in what is behind" a basketball 1202 when moved between image 1108 and the transformed image 1112. In order to do so, the image creation functionality 1110 uses images 1204, 1206 taken from the collection 202 to compute pixels of the lower-left edge of the cone 1208 to fill the hole formed from moving the basketball 1202. In this way, the image creation functionality 1110 may leverage actual knowledge of what is behind the basketball 1202 in the images, thus improving accuracy and efficiency over conventional techniques that processing the single image 1108, solely.

In another example, the image creation functionality 1110 is usable to infer a three-dimensional model of a scene captured by the image 1108 through use of the image and the plurality of other images 204 from the collection. The images 1108, 204, for instance, may capture different perspectives of the scene. Likewise, a depth map of the image scene may also be generated using the image 1108 and the images 204 from the collection, such as to determine a relative or absolute depth of objects in the scene. The depth map is usable to improve accuracy for object addition, removal, improvement of consistency of hole filling, scene lighting, and so forth.

In a further example, the image creation functionality 1110 is usable to generate semantic labels 208 that identify objects included in the image 216 based on the image 1108 and the other images 204 from the collection 202. The semantic labels 208, for instance, may be associated with each pixel in the image 1108 to identify an object associated with the pixel. Examples of semantic labels include sky, ground, standing object, type of object (e.g., car), name of object (e.g., basketball 1202), textures, and so forth. In this way, pixels describing one object in the image may be differentiated from pixels that describe other objects in the image. Further, the semantic labels 208 describe "what is being represented" by the pixels, which may also be leveraged to support a variety of functionality, such as to suggest application of corresponding image creation functionality based on a type of object represented, object removal, object duplication, and so forth.

In yet another example, the image creation functionality 1110 is usable to infer light sources using the image 1108 and the plurality of other images 204, from the collection 202. This inference may be generated using different perspective captured by the images and/or the same perspective with difference in object location. Like the depth map the three-dimensional modeling, this may be performed to support and improve a variety of other image creation functionality, such as to add or remove objects in a visually consistent manner. Other examples are also contemplated without departing from the spirit and scope of the techniques and system descried herein.

Image Identification of Suitability for Licensing

Figure 14:
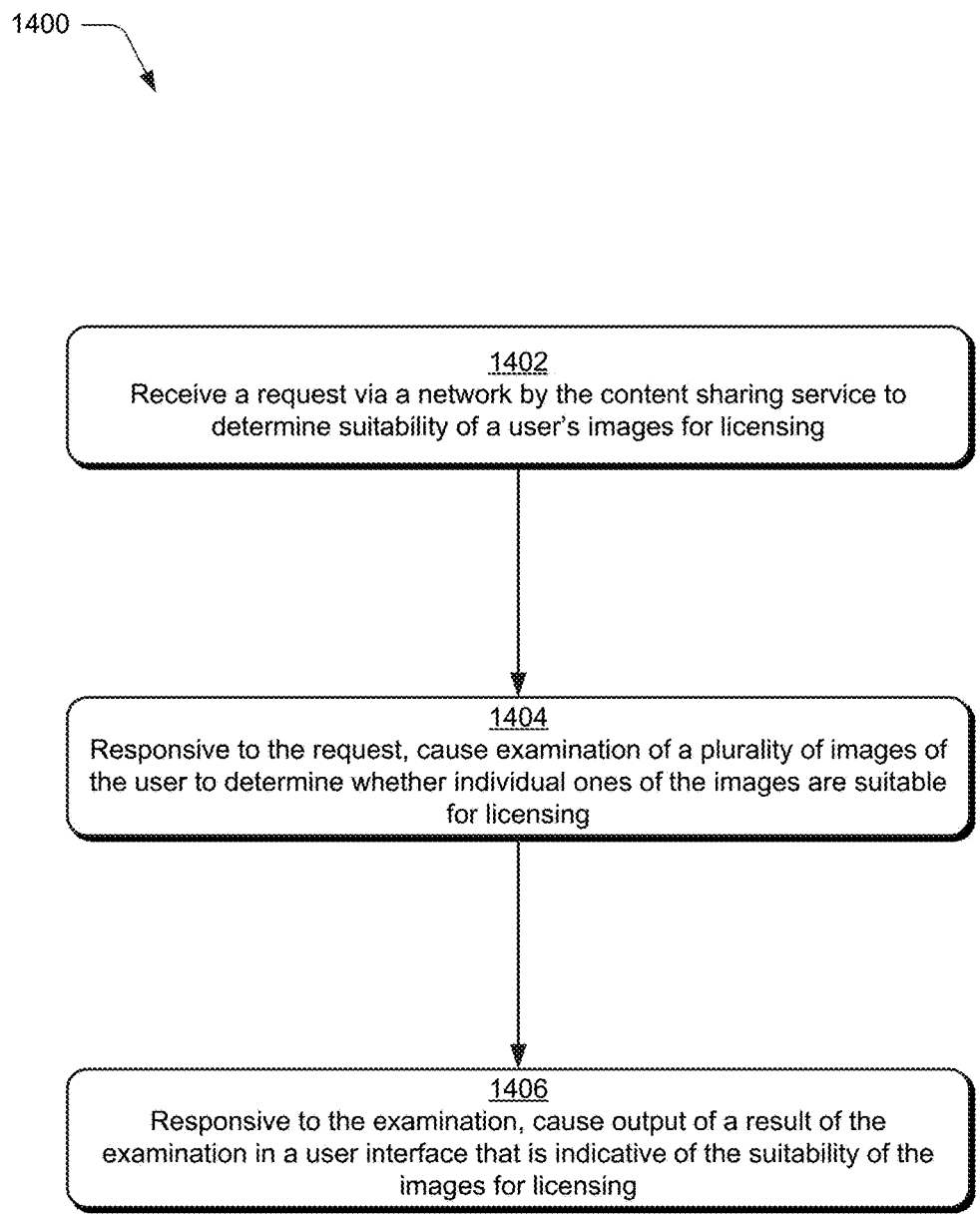
FIG. 14 depicts an example procedure.
Figure 15:
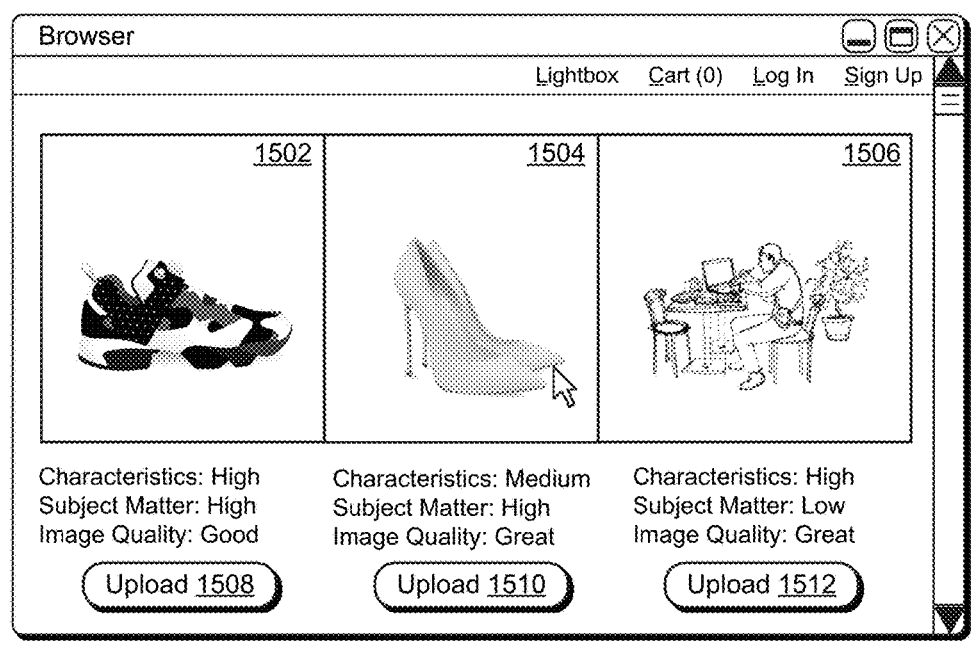
FIG. 15 depicts an example implementation of a user interface that leverages data obtained from a content sharing service to indicate suitability of images of a user for licensing as part of the service.

FIG. 14 depicts an example procedure 1400 and FIG. 15 depicts an example implementation 1500 of a user interface that leverages data obtained from a content sharing service 104 to indicate suitability of images of a user for licensing as part of the service. In this way, a user is provided with indications automatically and without user intervention as to which images are likely to be of interest to potential customers and thus may avoid "best guess" conventional techniques that are inefficient, labor intensive, and prone to error.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

As previously described, a creative professional may capture tens, hundreds, and even thousands of images. Conventionally, the creative professional manually examined each of these images to determine which images are to be made available for licensing from a content sharing service 104. Thus, the creative professional is forced in these conventional techniques to make a best guess as to desires of customers of the content sharing service 104, such as particular objects, orientations, image effects, and so forth.

In this example, the content sharing service 104 exposes functionality that leverages actual knowledge of which images are licensed for use from the content sharing service 104 to determine other images of potential interest to customers of the service. For example, a request a received via a network by the content sharing service 104 to determine suitability of a user's images for licensing (block 1402).

Responsive to this request, examination of a plurality of images of the user is caused to determine whether individual ones of the images are suitable for licensing (block 1404). The suitability may be determined in a variety of ways. In one example, suitability is determined based on shared characteristics of individual ones of the plurality with images that are licensed from the content sharing service 104. The characteristics, for instance, may include color, filters used, palettes, text and fonts used, contrast, saturation, image creation tools used, and so on as previously described for the image creation functionality of the user interface 1300 of FIG. 13. In this way, image characteristics in images actually licensed from the content sharing service 104 is used to determine suitability of a user's images for licensing.

In another example, subject-matter characteristics of the images with images that are licensed from the content sharing service are used to determine suitability for licensing. These subject-matter characteristics include locations, styles (e.g., landscape, portraits), object located in an object scene (e.g., female doctors, particular sporting events), and so forth. Thus, in this example the subject-matter of images licensed from the content sharing service are used to inform a creative professional as to which images are of potential interest to customers of the service. Other examples are also contemplated, such as image quality including focus, composition, and so forth.

Responsive to the examination, output is caused as a result of the examination in a user interface that is indicative of the suitability of the images for licensing (block 1406). An example of a user interface 1500 is illustrated in FIG. 15 that includes indications of image characteristics, subject matter, and image quality of images 1502, 1504, 1506 of a user for licensing by a content sharing service 104. As illustrated, individual indications are provided for each of the images 1502, 1504, 1506 indicating relative suitability based on the image characteristics, subject matter, and image quality. Image 1502, for instance, includes indications of "high" for image characteristics, subject matter as "high," and image quality as "good." For image 1504, image characteristics are indicated as "medium," subject matter as "high," and image quality as "great" whereas for image 1506 image characteristics are indicated as "high," subject matter as "low," and image quality as "great." Other examples are also contemplated, such as a single overall indication of whether the image is suitable for licensing.

From this, the creative professional may readily determine that images 1502, 1504 are suitable for upload 1508, 1510 through selection of corresponding options, whereas image 1506 has a lower likelihood of success. Further, the creative professional is also guided for subsequent image capture, such as by noticing the black and white image characteristics for images 1502 and 1506 are given "highs" and subject matter of shoes of images 1502, 1504 is also given "highs." Thus, this may motivate the creative professional to capture more images of shoes in black and white. A variety of other examples are also contemplated without departing from the spirit and scope of the discussion above.

Example System and Device

Figure 16:
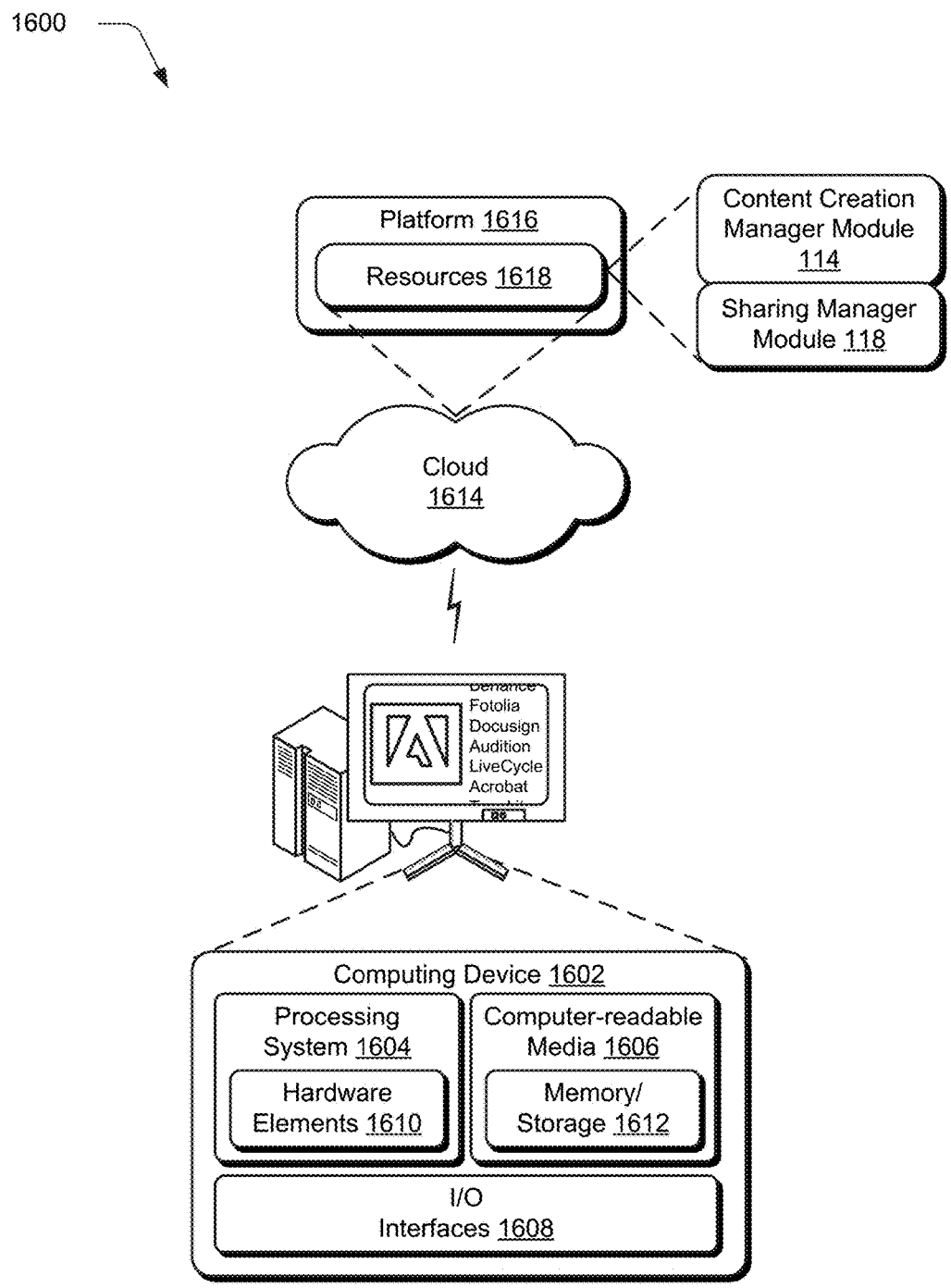
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that may implement the various techniques described herein. This is illustrated through inclusion of the sharing manager module 118. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital environment for image creation and sharing, a method implemented by one or more computing devices comprising:
   displaying an image within a user interface by the one or more computing devices along with a plurality of image creation functionalities that are each usable to transform an appearance of the image;
   receiving a request to apply an image creation functionality of the plurality of image creation functionalities to transform the image;
   responsive to receiving the request, accessing the image creation functionality;
   responsive to accessing the image creation functionality, obtaining from a content sharing service a plurality of other images from a collection that includes the image by the one or more computing devices, the images in the collection having a threshold amount of similarity one to another based on one or more similarity metrics; and
   transforming the appearance of the image according to the image creation functionality by using the image and the plurality of other images from the collection.

2. The method as described in claim 1, wherein the image creation functionality infers a three-dimensional model of a scene captured by the image using the image and the plurality of other images from the collection.

3. The method as described in claim 1, wherein the image creation functionality infers light sources from the image and the plurality of other images from the collection.

4. The method as described in claim 1, wherein the image creation functionality infers an optical flow from the image and the plurality of other images from the collection.

5. The method as described in claim 1, wherein the image creation functionality is used to perform hole filling using the image and the plurality of other images from the collection.

6. The method as described in claim 1, wherein the image creation functionality generates a depth map from the image and the plurality of other images from the collection.

7. The method as described in claim 1, wherein the image creation functionality semantically labels an object in the image using the image and the plurality of other images from the collection.

8. The method as described in claim 1, wherein the obtaining is performed through interaction over a network by the one or more computing devices with the content sharing service via which the image is licensed for use by the one or more computing devices.

9. In a digital environment for image creation and sharing, a system of a content sharing service comprising:
   a processing system; and
   computer-readable storage media having instructions stored thereon that, responsive to execution by the processing system, causes one or more operations to be performed comprising:
      displaying an image within a user interface along with a plurality of image creation functionalities that are each usable to transform an appearance of the image;
      receiving a request to apply an image creation functionality of the plurality of image creation functionalities to transform the image;
      responsive to receiving the request, accessing the image creation functionality;
      responsive to accessing the image creation functionality, obtaining from the content sharing service a plurality of other images from a collection that includes the image, the images in the collection having a threshold amount of similarity one to another based on one or more similarity metrics; and
      transforming the appearance of the image according to the image creation functionality by using the image and the plurality of other images from the collection.

10. The system as described in claim 9, wherein the plurality of other images are selectable for licensing from the content sharing service.

11. The system as described in claim 10, wherein the plurality of other images are obtained for display responsive to selection of at least one image that is used to represent the collection.

12. The system as described in claim 10, further comprising:
   licensing use of the plurality of other images responsive to verification of user credentials performed responsive to selection of the at least one image for licensing by the user;
   receiving a request from the user for the plurality of other images for use as part of the image creation functionality; and
   communicating the plurality of other images via a network for receipt by the user.

13. The system as described in claim 12, wherein the image creation functionality:
   infers a three-dimensional model of a scene captured by the image using the image and the plurality of other images from the collection;
   infers light sources from the image and the plurality of other images from the collection; or
   generates a depth map from the image and the plurality of other images from the collection.

14. The system as described in claim 12, wherein the image creation functionality infers an optical flow from the image and the plurality of other images from the collection.

15. The system as described in claim 12, wherein the image creation functionality is used to perform hole filling using the image and the plurality of other images from the collection.

16. The system as described in claim 12, wherein the image creation functionality semantically labels an object in the image using the image and the plurality of other images from the collection.

17. In a digital environment for image creation and sharing, one or more computer-readable storage media having instructions stored thereon that, responsive to execution by one or more processors, causes one or more operations to be performed comprising:
- displaying an image within a user interface along with a plurality of image creation functionalities that are each usable to transform an appearance of the image;
- receiving a request to apply an image creation functionality of the plurality of image creation functionalities to transform the image;
- responsive to receiving the request, accessing the image creation functionality;
- responsive to accessing the image creation functionality, obtaining from the content sharing service a plurality of other images from a collection that includes the image, the images in the collection having a threshold amount of similarity one to another based on one or more similarity metrics; and
- transforming the appearance of the image according to the image creation functionality by using the image and the plurality of other images from the collection.

18. The one or more computer-readable storage media as described in claim 17, wherein the plurality of other images are selectable for licensing from the content sharing service.

19. The one or more computer-readable storage media as described in claim 18, wherein the plurality of other images are obtained for display responsive to selection of at least one image that is used to represent the collection.

20. The one or more computer-readable storage media as described in claim 19, further comprising:
- licensing use of the plurality of other images responsive to verification of user credentials performed responsive to selection of the at least one image for licensing by the user;
- receiving a request from the user for the plurality of other images for use as part of the image creation functionality; and
- communicating the plurality of other images via a network for receipt by the user.

* * * * *